United States Patent [19]
Flaig

[11] 3,888,607
[45] June 10, 1975

[54] GEAR OIL PUMP, ESPECIALLY FOR MOTOR VEHICLE INTERNAL COMBUSTION ENGINES

[75] Inventor: Manfred Flaig, Stuttgart, Germany

[73] Assignee: Daimler-Benz Aktiengesellschaft, Germany

[22] Filed: June 1, 1973

[21] Appl. No.: 366,147

[30] Foreign Application Priority Data
June 3, 1972 Germany.......................... 2227119

[52] U.S. Cl. ............................................. 418/206
[51] Int. Cl. ............................................ F04c 1/08
[58] Field of Search.................... 418/206, 132, 135

[56] References Cited
UNITED STATES PATENTS
2,134,153 10/1938 Seyvertsen...................... 418/206 X
2,477,797 8/1949 Girz et al........................ 418/135 X
2,975,718 3/1961 Hodgson............................ 418/206

FOREIGN PATENTS OR APPLICATIONS
547,463 8/1942 United Kingdom................ 418/206

Primary Examiner—William L. Freeh
Assistant Examiner—Leonard Smith
Attorney, Agent, or Firm—Craig & Antonelli

[57] ABSTRACT

A gear oil pump, especially for motor vehicle internal combustion engines, which includes cylindrical spaces provided in the housing for the accommodation of the gears and with an inlet space and a discharge space; the inlet edges extending in the axial direction of the housing which are formed by the inlet space in conjunction with the cylindrical spaces for the gears, are thereby bevelled off.

18 Claims, 3 Drawing Figures

GEAR OIL PUMP, ESPECIALLY FOR MOTOR VEHICLE INTERNAL COMBUSTION ENGINES

The present invention relates to a gear oil pump, especially for motor vehicle internal combustion engines, with cylindrical spaces provided in the housing for the accommodation of the gears and with an inlet space and a discharge space.

It has been observed that gear oil pumps provided in motor vehicle internal combustion engines produce noises dependent on the rotational speed which impair the driving comfort because they continue in the oil lines and as a result thereof reach everywhere in the vehicle. The present invention is therefore concerned with the task to so construct a gear oil pump that no noises occur any longer during the operation thereof.

The underlying problems are solved according to the present invention in that the inlet edges extending in the axial direction of the housing which the inlet space forms together with the cylindrical spaces for the gears, are bevelled off.

By bevelling off the inlet edges, a continuous transition for the oil stream from the inlet space into the tooth gaps of the gears is created so that a detachment of the oil stream at the teeth of the gears running past non-bevelled off inlet edges, which is decisive for the production of noises, is far-reachingly precluded.

Insofar as an oil pump with an axial inlet into the inlet space is provided, the bevelling or chamfering of the inlet edges according to a further feature of the inventive subject matter may be constructed to decrease continuously from the area of the inlet.

Particularly advantageous effects are produced if, according to a preferred feature of the present invention, the bevellings or chamferings form within the area of the inlet an at least approximately tangential transition of the walls of the inlet space into the walls of the cylindrical spaces for the gears. Possibly also the discharge edges of the discharge space may be provided with bevelled off portions in order to avoid also at this location sudden detachments in the fed oil stream.

Accordingly, it is an object of the present invention to provide an oil gear pump, especially for motor vehicle internal combustion engines, which avoids by simple means the aforementioned shortcomings and drawbacks encountered in the prior art.

Another object of the present invention resides in a gear pump, especially for motor vehicle internal combustion engines, which eliminates the production of noise as a function of speed of the pump and thus increases the driving comfort.

A further object of the present invention resides in an oil gear pump of the type described above which far-reachingly minimizes the flow detachment of the oil stream at edge portions in the housing of the gear pump.

These and other objects, features and advantages of the present invention will become more apparent from the following description when taken in connection with the accompanying drawing which shows, for purposes of illustration only, one embodiment in accordance with the present invention, and wherein:

FIG. 4 is a cross-sectional view similar to FIG. 3, but with the addition of the oil inlet and oil discharge to the oil pump housing; and FIG. 5 is a plan view similar to FIG. 1 showing a modified embodiment of the present invention.

Figure 1:
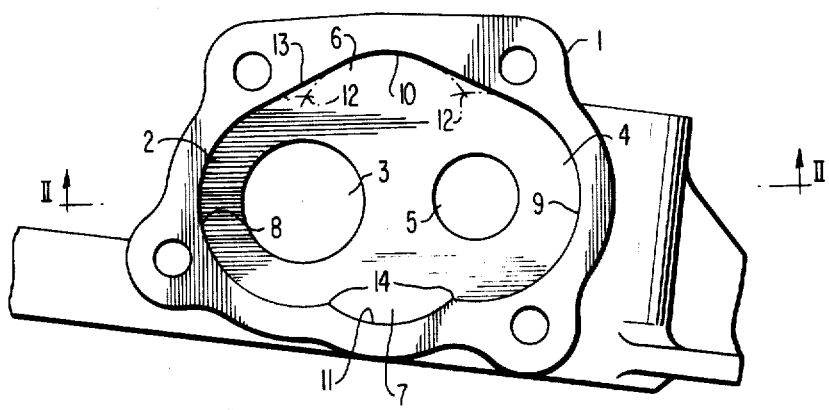
FIG. 1 is a plan view on a housing for a gear oil pump according to the present invention with its cover removed.

Referring now to the drawing wherein like reference numerals are used throughout the various views to designate like parts, according to FIG. 1, reference numeral 1 designates in this figure a housing for a gear oil pump which will find application primarily as aggregate for a motor vehicle internal combustion engine. A recess is provided in the housing 1 which is composed of a space 2 for a gear to be journalled in a bore 3, of a space 4 for a gear to be journalled in a bore 5, of an inlet space 6 and of a discharge space 7.

The walls 8 and 9 of the spaces 2 and 4, which extend in the axial direction, are disposed, as can be seen from the plan view of FIG. 1, along circles, which is also the case for the walls 10 of the inlet space 6 and the walls 11 of the discharge space 7.

Figure 2:
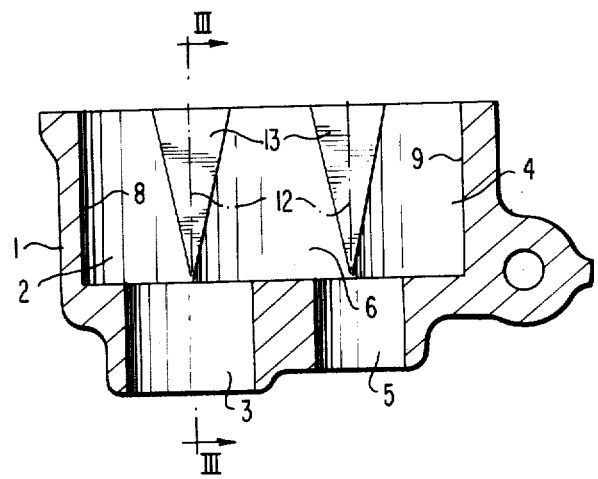
FIG. 2 is a cross-sectional view through the housing taken along line II—II of FIG. 1.
Figure 3:
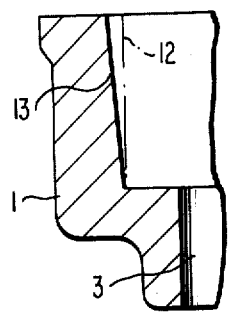
FIG. 3 is a partial cross-sectional view through the housing taken alone line III—III of FIG. 2.

In order not to permit the occurrence of high frequency noises resulting from the detachment of the oil stream at the teeth of the gears, the inlet edges 12 which are normally present between the walls 8, 9 and the wall 10 and which are indicated in the drawing in dash and dot lines, are replaced, as can be seen in particular from FIGS. 2 and 3, by bevelled off sloping portions 13 which continuously decrease from the inlet into the inlet space 6 which takes place in the axial direction from the housing cover in the direction toward the housing bottom so that the triangular wall surfaces are formed as shown in FIG. 2 which establish within the area of the cover a tangential transition of the wall 10 of the inlet space 6 into the walls 8 and 9 of the spaces 2 and 4 as shown in FIG. 1.

The discharge edges 14 (FIG. 1) are left unchanged in the illustrated embodiment within the area of the discharge space 7. Possibly, however, these edges 14 may also be bevelled off or chamfered in the manner similar to the edges 12 of the inlet space (see FIG. 5).

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A gear oil pump with axial housing means, said housing means being provided with first axial wall means for forming substantially cylindrical spaces for the arrangement of gears therein, wall means defining inlet space means, and discharge space means, characterized in that the inlet space means together with the substantially cylindrical spaces for the gears, form inlet edges which are axially bevelled with respect to said first wall means to form bevelled off portions, and the bevelled off portions form within the area of an inlet into the inlet space means an at least approximately tangential transition of the walls of the inlet space means into the walls of the cylindrical spaces for the gears.

2. A gear oil pump comprising:

axial wall means including first and second axial wall means with said first wall means forming at least first and second gear spaces having gears therein and with said second wall means forming inlet space means and discharge space means, said inlet space means and discharge space means being located between said gear spaces, wherein said discharge space means, together with at least one of said gear spaces, forms axially extending discharge edge means, said edge means being axially bevelled with respect to said axial wall means so as to form at least one bevelled off wall portion, whereby said edge means is adapted to provide an effective seal of varying dimension between a periphery of a corresponding gear and said first wall means.

3. A gear oil pump with axial housing means, said housing means being provided with first axial wall means for forming substantially cylindrical spaces for the arrangement of gears therein and with inlet space means and discharge space means, characterized in that the inlet space means together with the substantially cylindrical spaces for the gears, form inlet edges which are axially bevelled with respect to said first wall means to form bevelled off portions, whereby said inlet edges are adapted to provide effective seals of varying dimension between the first wall means and peripheries of corresponding gears.

4. An oil pump according to claim 1, with an axial inlet means into the inlet space means at an end of said axial housing means, characterized in that the bevelled off portions of the inlet edges continuously decrease in a direction away from said inlet means.

5. An oil pump according to claim 4, characterized in that the bevelled off portions form within the area of the inlet an at least approximately tangential transition forming walls of the inlet space means into the walls of the cylindrical spaces for the gears.

6. An oil pump according to claim 5, characterized in that the discharge space means is also provided with discharge edges having bevelled off portions.

7. An oil pump according to claim 1, characterized in that the discharge space means is also provided with discharge edges having bevelled off portions.

8. An oil pump according to claim 7, with an axial discharge from the discharge space means, characterized in that the bevelled off portions form within the area of the discharge an at least approximately tangential transition forming walls of the discharge space means into the walls of the cylindrical spaces for the gears.

9. A gear oil pump comprising:
wall means including first and second axial wall means with the first axial wall means forming at least first and second gear spaces having gear means therein and with said second axial wall means forming inlet space means and discharge space means, said inlet space means and discharge space means being located between said gear spaces, wherein said inlet space means, together with at least one of said gear spaces, forms inlet edge means extending substantially in the axial direction of the first wall means, said edge means being axially bevelled with respect to at least said first axial wall means so as to form at least one bevelled off wall portion which forms a transition wall that is tangential at one end to the first and second wall means.

10. The oil pump of claim 9, further comprising axial inlet means into the inlet space means wherein the at least one bevelled wall portion tapers in a direction away from said inlet means.

11. The oil pump of claim 9, wherein the gear spaces are substantially cylindrical.

12. The oil pump of claim 9, wherein said discharge space means, together with at least one of said gear spaces, forms axially extending discharge edge means, said discharge edge means being axially bevelled with respect to said axial wall means so as to form at least another bevelled off wall portion.

13. A gear oil pump comprising:
axial wall means forming at least one gear space means for the arrangement of gear means therein,
said wall means defining inlet edge means and discharge edge means, at least one of said edge means being axially bevelled with respect to said wall means so as to form at least one bevelled edge means, whereby said at least one edge means is adapted to provide an effective seal of varying dimension between a periphery of the gear means and the axial wall means.

14. The oil pump of claim 13, wherein the at least one bevelled edge tapers.

15. The oil pump of claim 13, wherein gear means are provided which are substantially coaxial with said gear space means, and wherein the inlet and outlet space means extend axially with respect to said gear means.

16. The oil pump of claim 15, wherein the inlet and outlet space means are located between said gear space means on opposite sides of a common housing wall.

17. The oil pump of claim 12, wherein the wall portion is triangular.

18. The oil pump of claim 13, wherein inlet and outlet space means are provided for supplying oil to said wall means.

* * * * *